Aug. 14, 1945.  S. K. WELLMAN ET AL  2,381,941
FRICTIONAL APPARATUS
Filed May 19, 1942  5 Sheets-Sheet 2

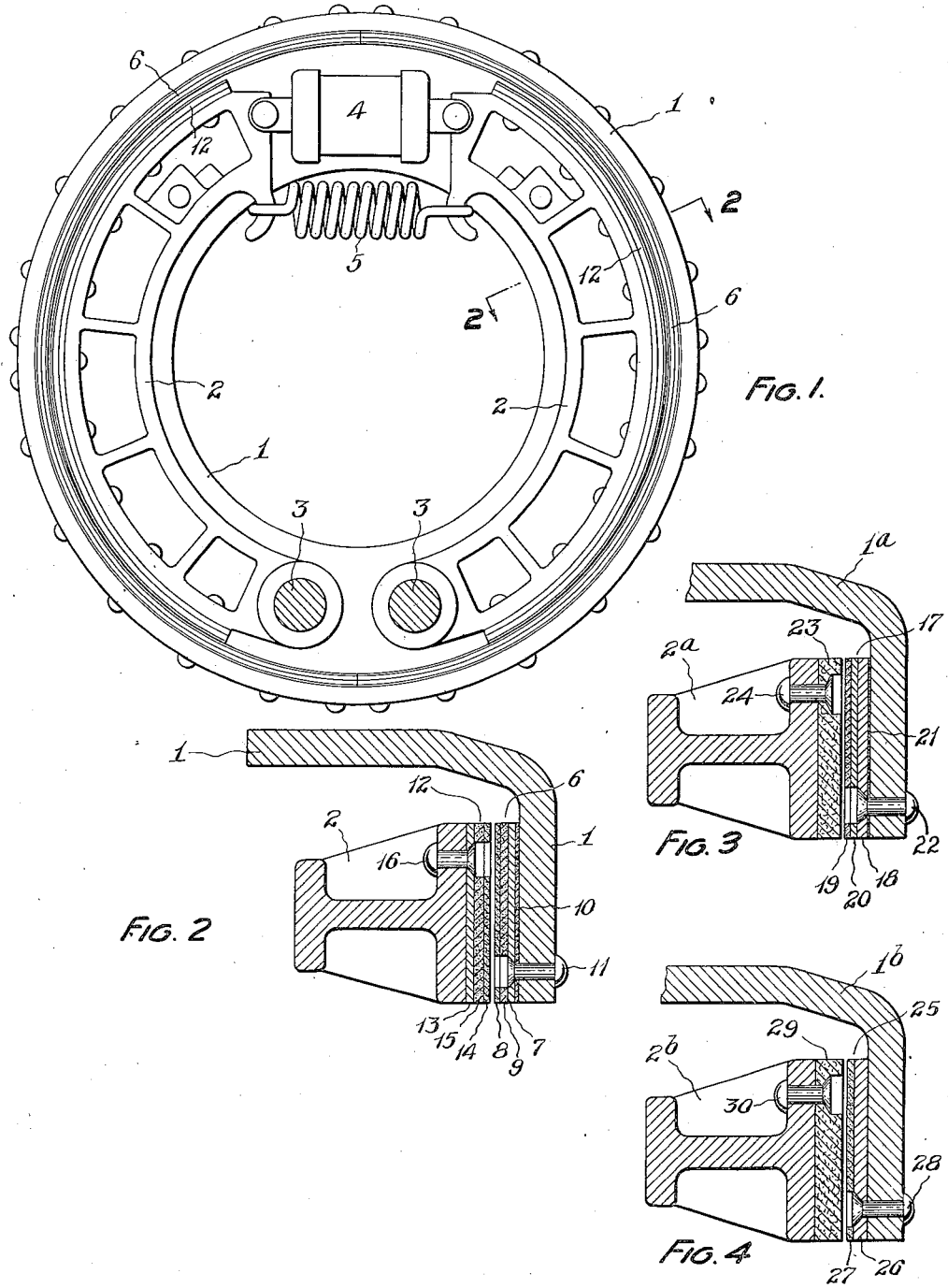

INVENTORS:
S. K. Wellman
BY E. B. Sawyer
Ray S. Sehr
ATTORNEY.

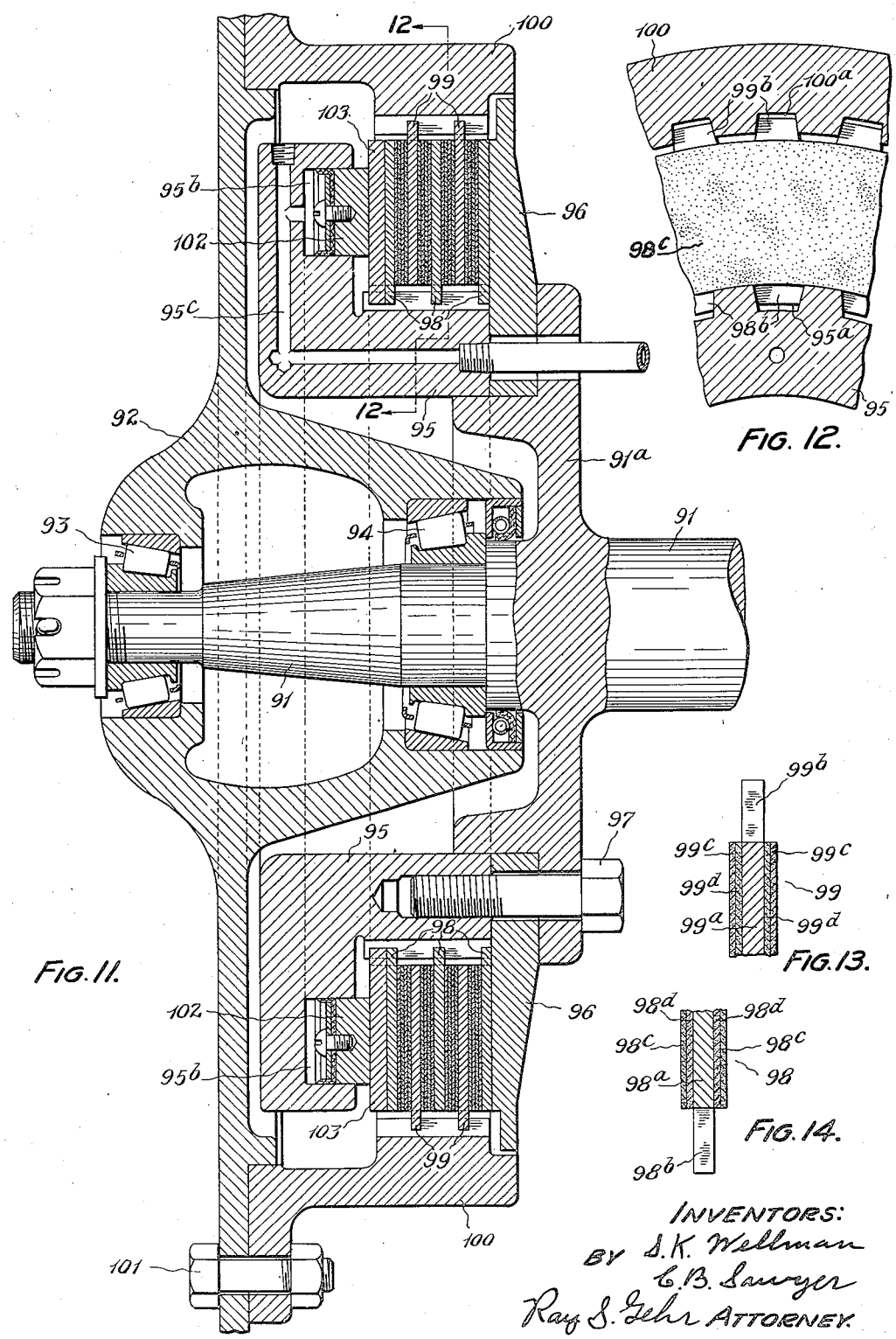

Aug. 14, 1945.    S. K. WELLMAN ET AL    2,381,941
FRICTIONAL APPARATUS
Filed May 19, 1942    5 Sheets-Sheet 5

INVENTORS:
S. K. Wellman
BY C. B. Sawyer
Ray S. Gehr ATTORNEY.

Patented Aug. 14, 1945

2,381,941

UNITED STATES PATENT OFFICE 2,381,941

FRICTIONAL APPARATUS

Samuel K. Wellman and Charles B. Sawyer, Cleveland Heights, Ohio, assignors to The S. K. Wellman Company, Cleveland, Ohio, a corporation of Ohio Application May 19, 1942, Serial No. 443,562

16 Claims. (Cl. 188—251)

This invention relates to brakes, clutches, and other frictional devices, including bearings, in which more or less slippage occurs between mutually engaging parts in the normal operation of the devices.

In the operation of brakes and clutches the heat generated by relative slippage of the mutually engaging frictional surfaces causes high temperatures which may have very injurious effects upon the friction elements and the parts carrying the said elements. The same thing is true of bearings in the operation of which normal operating conditions and temperatures are not maintained. In the case of brakes and clutches, such high temperatures and injurious effects are particularly likely to result where the brake or clutch must serve under severe operating conditions, as in the case of the brakes of large airplanes and of trucks and busses operating in mountainous regions, and in the case of the clutches of large trucks, busses and tractors and even of small automobiles if the clutch is operated by the driver in a manner to cause excessive slippage between the friction elements. In the case of bearings the injurious effects in question usually occur under abnormally heavy loads and when normal lubrication fails.

The injurious effects referred to take various forms but the most serious effects are the warping, contracting and expanding and the checking and progressive cracking of ferrous metal brake and clutch parts subjected to the excessive heat, and the scuffing of bearing surfaces and mechanical disintegration of bearing structures. These injurious effects vary with the type of brake, clutch and bearing constructions involved but none of the known sliding friction types of construction heretofore used is immune from such injurious effects.

In the use of brakes and clutches having steel or iron elements with sintered metallic facings such as described in United States Letters Patent No. 2,178,527, difficulties have been encountered under severe or heavy duty service conditions due to distortion or weakening of the steel or iron parts of the friction elements. Thus in the case of disc brakes of the sort in question used on the ground wheels of large transport and bomber airplanes the braking loads which must be sustained are extremely severe and the friction elements of the brakes, when the planes land, are raised to temperatures as high as 900° to 1100° F. or even higher. Under such severe service there results distortion of the friction elements in the form of permanent expansion and warping and the proper operation of the brake is interfered with.

Similarly, in the case of clutch discs such as that described in the said Patent No. 2,178,527 and composed of a plain steel disc with sintered metal facing rings welded thereto, it has been found that under severe service with a high rate of heat generation, the disc becomes sufficiently warped to interfere with satisfactory operation.

Also, in the case of heavy duty vehicle brakes of the drum type more or less similar difficulties have been encountered. For example, in the case of a brake in which the braking surface of the drum was faced with a composite lining having a backing of steel and a welded-on sintered metal facing, under severe operating conditions the steel backing of the lining was distorted and expanded in width sufficiently to shear off its securing rivets.

Furthermore, such difficulties have not been limited to drum brakes having composite linings with sintered metal facings. Thus in the case of the older, more conventional form of drum brakes in which expanding shoes lined or faced with molded compositions of asbestos or the like engage the unlined inner drum surface of ferrous metal, it has been found that under heavy duty conditions, as where heavy trucks are operated in mountainous districts, the metal forming the friction surface of the brake drum is subject to injury of a peculiar sort. The injurious effect usually starts with a superficial checking of the metallic friction surface and under continued service of the brakes the cracks deepen until disintegration of the metal structure results, and a replacement of the injured drum is necessary; and naturally the roughening of the friction surface of the drum caused by the checking and cracking of the metal causes a rapid wear and deterioration of the facing of the brake shoes.

In the case of bearings the injuries in question usually start with a scuffing of the bearing surface. This may be followed by roughening of the mating journal surface with resultant generation, usually locally, of excessively high temperatures and, in the case of anti-friction metal bearings, the disintegration of the anti-friction metal part and its separation from its backing or shell.

It is an object of the present invention to produce new and improved frictional apparatus in which the heat generated by a high rate of energy absorption is so controlled and distributed that injurious consequences, such as are referred to above, are minimized or eliminated.

A further object of the invention is to provide structures for effecting such heat control and distribution which are practically applicable to the production of various types of brake, clutch and bearing devices.

Various other objects of the invention ancillary or incidental to the general objects stated above will be made apparent in the description which follows.

The attainment of the foregoing stated objects of the invention is based primarily upon the discovery that many, if not all, of the above noted defects or shortcomings of prior frictional apparatus have been due essentially to highly unequal or non-uniform heating of parts of the apparatus. The results secured by the invention are further essentially based upon the concept that in frictional apparatus all parts of the heat-absorbing structure, including the means for attaching the frictional facing elements or structures to the backing or supporting structures, must be of such a character that their integrity will not be destroyed when, under severe or abnormal conditions, the apparatus is subjected to high temperatures.

The invention, then, consists in certain forms, constitutions and combinations of parts which embody or are based upon the discoveries or concepts above referred to.

In the following description, for the purposes of further explanation and illustration of the invention, several applications thereof to different types of frictional apparatus are described in connection with the accompanying drawings.

In the drawings,

Fig. 1 is a side elevation of brake mechanism of the drum type embodying the invention.

Fig. 2 is an enlarged section on the line 2—2 of Fig. 1.

Figs. 3 and 4 are fragmentary sectional views corresponding to Fig. 2 but showing two different modifications of the construction shown in Fig. 2.

Fig. 11 is an axial sectional view showing a brake of multiple disc type embodying the invention.

Fig. 12 is a fragmentary section on the line 12—12 of Fig. 11.

Figs. 13 and 14 are fragmentary radial sectional views on an enlarged scale of two of the friction rings of the brake shown in Fig. 11.

Figure 6:
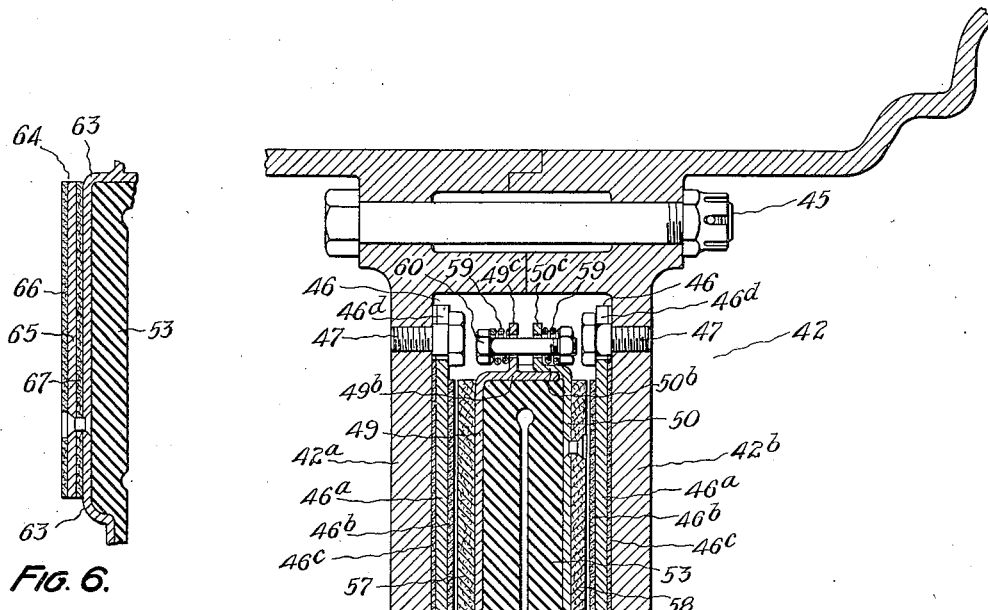
Fig. 6 is a fragmentary sectional view showing a modification of the construction illustrated in Fig. 5.

Referring in detail to the structures illustrated in the drawings and first to Figs. 1 and 2, 1 designates a brake drum such as is used on motor vehicle wheels and which may be either cast or pressed from iron or steel of a suitable type. The numerals 2,2 indicate the usual type of brake shoes, said shoes being mounted on pivotal supports 3,3 carried by the axle structure (not shown). 4 indicates a brake-actuating hydraulic cylinder of the conventional type and 5 is a retracting spring connected to the movable ends of the brake shoes in well known manner.

The brake drum 1 is provided with a lining constructed in accordance with the present invention and designated as an entirety by the numeral 6. As shown in Fig. 1, the lining is divided into two semicircular parts. Each of said parts has a unitary multiple-layer construction and comprises a backing strip or structural layer 7 preferably of sheet steel, a friction facing layer 8 and an intermediate layer 9 between the backing 7 and the friction facing 8. In the construction shown, the facing layer 8 is of the sintered metallic type formed by compacting and sintering a mixture of powdered or finely divided material consisting predominantly of high-melting-point metal such, for example, as copper and/or iron, mixed with minor amounts of low-melting-point metal such as tin, zinc, lead and the like and usually some graphite and some finely divided abrasive material such as silica. Frictional facings of this character and methods and apparatus for making them are disclosed in United States Patent No. 2,178,527 to which reference may be made for detailed information.

The intermediate layer 9 is made entirely of metal having a high melting point and a thermal conductivity high in comparison with the material of the facing 8 and the steel backing strip 7. Among the metals technically suitable for the intermediate layer 9 are silver, copper, aluminum and other metals having high melting points and comparatively high thermal conductivity, such for example as copper-silver, copper-chromium and copper-beryllium alloys. Practically, however, copper is the most generally suitable metal since, while its thermal conductivity is somewhat lower than that of silver, the difference is not great and its melting point is higher than that of silver, so that there is little to offset the great advantage of copper's lower cost. In the specific construction illustrated in Figs. 1 and 2, the intermediate layer 9 is formed of compacted and sintered copper powder.

A composite multiple-layer structure comprising the layers 7, 8 and 9 may be fabricated in a variety of ways so as to produce an intergral structure. For example, the layers 8 and 9 may be separately formed by briquetting, as described in said Patent No. 2,178,527, and then assembled with the steel strip 7 after the latter has been prepared, as by electroplating with copper, in accordance with the procedure disclosed in the said Patent No. 2,178,527 and the three layers integrally united by the sintering of the layers 8 and 9. Alternatively, the layer 9 may be formed and sintered to the steel strip 7 and the layer 8 may then be briquetted and attached to the layer 9 by sintering. Of course also the two layers 8 and 9 may be briquetted and sintered together and thereafter welded to the suitably prepared steel strip 7.

In order to facilitate the production of a suitable intimate union between the friction lining 6 and the drum 1, we prefer to interpose between strip 7 and the drum flange a thin metallic layer 10 having a malleable or deformable structure. The layer 10 should be formed of high-melting-point metal and we prefer to employ copper and preferably sintered finely divided copper for the purpose as it provides a more or less porous structure having a suitable degree of malleability and deformability and at the same time has relatively high thermal conductivity. The layer 10 may be introduced as a separate element between the lining unit 6 and the drum 1 but we prefer ordinarily to make it an integral part of the lining 6 by sintering it to the outer side of the steel strip 7. This may be accomplished in the operation of sintering the other layers 7, 8 and 9, together. The lining 6 is suitably perforated as shown in Fig. 2 to receive rivets 11 which serve to mechanically secure the lining 6 rigidly to the brake drum. In this connection it is observed that the strength of the solid metal layer 7 is not only transmitted to the sintered metal layers 9 and 8 but also provides the strength and rigidity to make feasible the riveted or other equivalent mechanical connection between the lining and the drum 1. In some cases if a high degree of thermal conductivity between the lining 6 and the drum 1 is not required the layer 10 may be formed of a mixture of copper and some lower melting point metal such as tin, the mixture however consisting predominantly of copper so that the metal of the layer shall have a relatively high melting point and lower thermal conductivity. Alternatively, the layer 10 may be formed by sintering powdered metal such as aluminum.

For engagement with the lining 6 of the drum 1 the brake shoes 2 may be provided with friction facings of a wide variety, including cast iron, steel, molded compositions of asbestos and the like and sintered metal. However, in the construction illustrated we provide a multiple-layer integral facing 12 comprising a steel strip 13, a facing strip 14 of sintered material and an intermediate layer 15 of sintered copper, such three-layer part being fabricated in the same manner as the layers 7, 8 and 9 of the lining 6. The facing 12 is secured to the shoes 2 by rivets 16.

In the operation of a brake apparatus such as that shown in Figs. 1 and 2, acceptable performance may be secured at remarkably high rates and total quantities of energy absorption. With the improved lining and facing structures, heat generated by relative slippage of the friction surfaces of the lining and facing is transmitted through the relatively thin facing layer 8 of the lining 6 into the intermediate layer 9 and, because of the high thermal conductivity of the material of the layer 9 and because of its adequate thickness, said layer acts to rapidly conduct the heat entering it at any particular point along lines parallel to the layers. Consequently any tendency of the friction layer 8 to build up abnormally high local temperatures, due to local high points or roughness of the friction surfaces, is strongly opposed by the rapid distribution of the heat from such points throughout the intermediate layer 9, so that the latter layer is maintained at a relatively uniform temperature and the steel layer 7 is in turn relatively uniformly heated. Indeed, the heat distributing effect of the intermediate layer of the lining has a strong temperature-equalizing effect also upon the exposed friction layer 8 of the lining so that differences in temperatures between different parts of each layer of the integral structure are minimized, although the lining, and especially the friction surface of it, may reach high temperatures under severe operating conditions. As a result localized expansion of the lining structure and distortion, warping and checking thereof, do not occur at much higher rates of energy absorption than were permissible in the case of prior constructions of frictional apparatus. While under severe operating conditions the parts may be heated to rather high temperatures, the structure is well adapted to sustain such temperatures without injury because, as will presently be explained, the predominant constituent materials are high-melting-point metals and the bonds between the parts of the structure involve only high-melting-point metals.

The friction facings 12 of the shoes 2 function in substantially the same manner as does the lining 6 of the brake drum. In the case of the shoes the steel backing layer 13 has not been provided with a facing of deformable metal corresponding to the layer 10 of the lining 6 because the shoes, being ordinarily enclosed, cannot dissipate heat as readily as the drum 1 and it is therefore desirable to carry off the major part of the heat generated through the drum, this result being facilitated by providing better thermal contact between the lining 6 and the drum than between the facing 12 and the shoe.

Because of the relatively high temperatures at which it is feasible to operate the improved type of frictional apparatus without undue injury or rapid deterioration thereof, it becomes highly important that the frictional lining and facing structures be in all respects capable of withstanding such temperatures. As previously mentioned, this end is secured, in the case of the lining structure 6, for example, by making the frictional layer 8 predominantly of high-melting-point metal, the intermediate layer 9 also of high-melting-point metal and by integrally uniting the intermediate layer to the layer 8 and to the layer 7 by means of bonds capable of withstanding the said high temperatures without disintegration under operating stresses. Such bonds are readily effected between the layers 8 and 9 by heating such layers to sintering temperatures, depending upon their compositions, and under conditions set forth in the aforesaid Patent No. 2,178,527. Also such bonds between sintered material and sheet steel, as between the layer 9 and the layer 7 of the lining 6, can be effected by the direct welding method disclosed in said Patent No. 2,178,527. However, such direct welding of the sintered layers to the solid metal layer is not essential in the carrying out of the invention since an alloy bond between the layers can be produced by the use of an intermediate bonding layer of high-melting-point metal. The direct welding method, however, has the advantage of lower cost.

Similarly the means for effecting the connection between the lining 6 and the brake drum 1 must be capable of withstanding the high temperatures in question without disintegration and that end is secured, for example, by the use of rivets of adequate holding capacity. Where the union between the lining 6 and the drum 1 includes a layer of deformable metal, such as the layer 10, this layer also should be formed of metal of high melting point. In the operation of high duty brakes, temperatures of the brake parts have been observed with thermocouples as high as 900° to 1100° F., indicating still higher temperatures in some parts of the structure, and the expressions "high temperatures" and "high-melting-point metals," as used herein, refer to temperatures and to melting points upwards of 900° F.

The modified construction shown in Fig. 3 of the drawings has the brake drum 1ª provided with a multiple-layer lining 17 comprising a steel layer 18, a facing layer 19 of sintered metallic material of the same character as the layer 8 of the first described construction, and an intermediate layer 20 of solid copper. Such a construction may be conveniently provided by using copper clad steel strip material of known character or by electroplating a solid layer of copper on sheet steel to produce the layers 18 and 20 and attaching to the copper layer the sintered facing layer 19. The strip 17 is also preferably provided with a thin layer 21 of sintered metal to insure good union between the lining and the drum 1ª, the lining being mechanically secured to the drum by rivets 22. The sintered layers 19 and 21 may be formed and bonded to the steel-copper strip 18, 20 by sintering, as above described.

In the modified construction the shoe 2ª is fitted with a friction facing 23 of the molded fibrous material type, the facing being secured in well known manner by rivets 24. Molded facing materials operate satisfactorily against the sintered metallic facings, such as the facing layer 19, if the working temperatures and pressures are not too high, but such molded materials are relatively poor conductors of heat and it will therefore be apparent that with the construction of Fig. 3 a larger proportion of the heat generated by the brake must be dissipated through the brake drum than in the case of the first described construction. Generally speaking, metallic friction facings for the brake shoes are to be preferred.

An alternative embodiment of our three-layer structure is shown in Fig. 4 where the cylindrical part of brake drum 1ᵇ serves as the strong structural layer and is fitted with a multiple-layer lining 25 comprising a layer 26 of solid copper faced with a layer 27 of sintered finely divided friction material composed predominantly of high-melting-point metal, preferably copper or iron or a mixture thereof. The layer 27 is integrally bonded directly to the layer 26 by sintering in accordance with known practice previously mentioned. The lining 25 is secured to the drum 1ᵇ by rivets 28. With the mutually engaging surfaces of the parts 1ᵇ and 26 formed to fit nicely together, the rivets 28 serve to intimately unite the layer 26 and the structural layer formed by the cylindrical wall of the drum. This type of construction is made feasible by the fact that the solid metal layer 26 of high conductivity is also sufficiently rugged to make the riveted connection with the wall of the drum rigid and durable and capable of maintaining the desired intimate union between the intermediate layer and the backing layer of the three-layer structure.

The brake shoe 2ᵇ of this last construction is generally similar to the shoe 2ª of Fig. 3, a renewable facing 29 of molded fibrous material secured by rivets 30 being shown for convenience of illustration.

Figure 5:
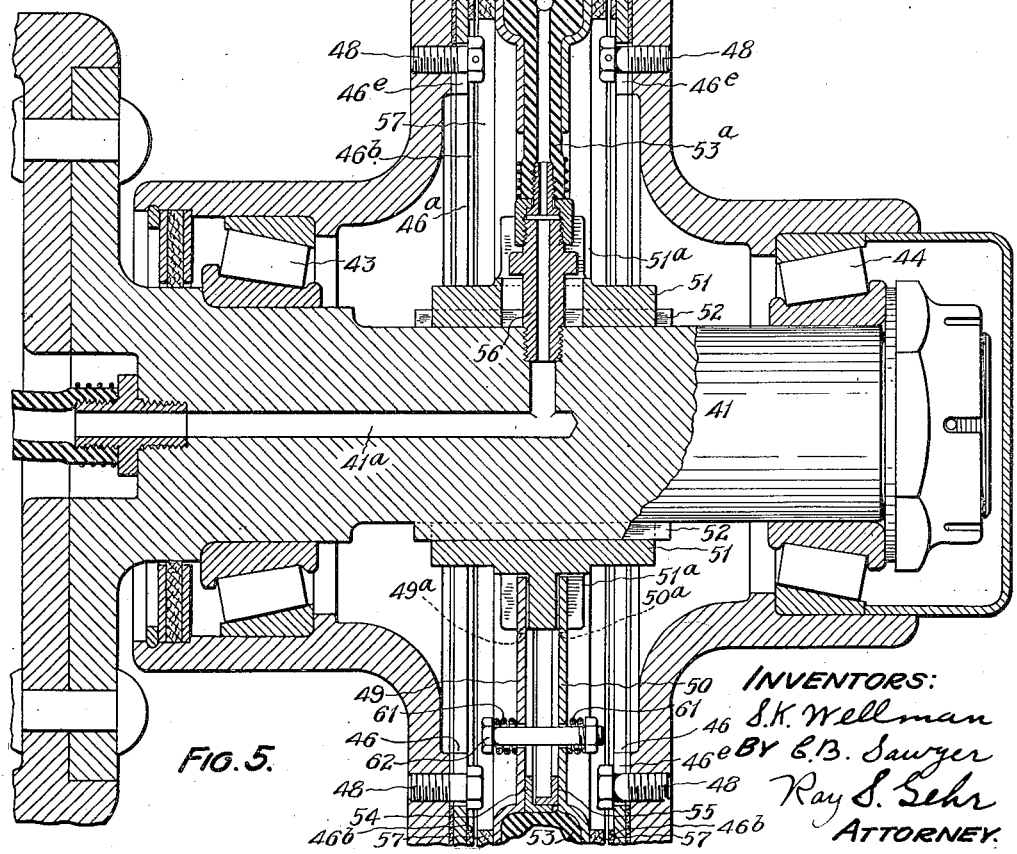
Fig. 5 is a fragmentary axial sectional view of an airplane wheel and brake mechanism enclosed therein, this construction illustrating the application of the present invention to a disc type of brake.

In Fig. 5 of the drawings is shown an embodiment of the present invention in a disc type of brake suitable for the landing wheels of large airplanes such as commercial transport planes and military bombers. As is well known, such planes must land at relatively high speeds and because of their great weight the brakes must absorb and transform in a short time large amounts of energy in order to bring the plane to rest within a ground run of reasonable length.

In the construction shown, 41 is a stub axle upon which is mounted a ground wheel, designated as an entirety by 42, suitable anti-friction bearings 43 and 44 being interposed between the axle and wheel. The wheel comprises two halves 42ª and 42ᵇ which are rigidly secured together by means of a circumferential series of bolts 45. To secure desired lightness, the wheel 42 may be made of suitable aluminum or magnesium alloy. On the inner side of each of the wheel halves 42ª and 42ᵇ is arranged an annular friction disc designated as an entirety by 46, said discs being secured to their respective wheel halves by circumferential series of bolts 47 and 48. Each of the discs 46 comprises a relatively thick layer 46ª of solid metal having high thermal conductivity, preferably copper, although aluminum may in some cases be used advantageously. The disc further comprises a friction facing 46ᵇ of sintered metallic material composed predominantly of high-melting-point metal. The layer 46ᵇ is integrally united to the layer 46 of solid metal by sintering in known manner, as previously explained. Finally the disc 46 comprises a thin layer 46ᶜ of deformable metal of high thermal conductivity and preferably is formed by sintering a layer of compacted copper powder to the back surface of the solid metal layer 46ª.

The annular discs 46 are formed on their outer and inner edges with circumferential series of radially extending slots 46ᵈ and 46ᵉ, respectively, to receive the securing bolts 47 and 48 and by tightening these bolts to a suitable degree, radial expansion and contraction of the discs 46 in relation to the wheel halves 42ª, 42ᵇ is permitted, this being a highly important feature of the construction because of the high temperatures which are attained by the discs 46.

It will be observed that the two disc-like frictional elements of the wheel 42 which have been described constitute multiple layer structures of the same general type as that shown in Fig. 4. That is, in Fig. 5 the web part of each of the wheel halves 42ª and 42ᵇ constitute the strong structural layer, just as does the cylindrical part of the drum 1ᵇ in Fig. 4; and in both figures the intermediate, highly conductive layer is made of solid metal and is strong enough to make it possible to attain the desired intimate union between the intermediate layer and the backing layer by mechanical means. The only difference is that in Fig. 5 the intermediate layers are backed with thin coatings (46ᶜ) of deformable metal which secures the desired intimate union between the intermediate and structural layers without initially forming their mutually engaging surfaces with as high a degree of accuracy as is required in the Fig. 4 construction.

Two movable disc shape brake elements 49 and 50 are disposed between the two discs 46, 46 and said discs 49 and 50 are non-rotatably connected with a sleeve 51 which is non-rotatably secured on the shaft 41 by means of splines 52. The sleeve 51 is formed with a peripheral series of radially extending teeth 51ª with which slots 49ª and 50ª in the inner edges of the discs 49 and 50 engage, this construction permitting lateral or axial movement of the discs. Between the discs 49 and 50 is arranged an expansible rubber tube expander 53 which is connected by means of a tubular extension 53ª with a nipple 56 which in turn communicates with a supply conduit 41ª in axial 41 so that compressed air or other fluid under pressure may be supplied to the rubber tube 53 to expand the brake discs 49, 50 toward the discs 46, 46. To restrain the rubber tube 53 while it is under pressure, the outer edges of the discs 49 and 50 are formed with mutually telescoping flanges 49b and 50b and similarly the inner edge of the tube 53 is supported by flanged members 54 and 55 secured to the inner sides of discs 49 and 50. To the faces of the discs 49 and 50 are secured, as by rivets, friction facings 57 and 58, respectively, of molded fibrous material, these facings being of annular ring form to match the annular form of the friction discs 46, 46. To insure free release of the brake, the discs 49 and 50 at their outer peripheries are provided with a circumferential series of lugs 49c, 50c which are engaged by coil springs 59, 59 that abut against the heads and nuts of bolts 60 which extend through apertures in the said lugs. In addition, similar release springs 61, 61 are mounted on bolts 62 carried by the discs 49, 50 at points radially inside of the friction surfaces of the brake.

The operation of the brake shown in Fig. 5 will be readily understood from the foregoing description and it will be apparent that the principles of the present invention which have been explained in connection with Figs. 1 to 4 find embodiment in this disc form of brake. In brakes of the general type shown in Fig. 5 as previously constructed, extremely serious difficulties were encountered, particularly in applications thereof to large, heavy airplanes. The amount of energy which it was necessary for the brakes to handle in an exceedingly short interval of time was so great that it was found practically impossible to operate them without destructive results due to warpage and even softening and fracture of the metal parts. The results which have been secured with an apparatus such as illustrated in Fig. 5 utilizing the novel multiple-layer friction parts have been very remarkable. In fact, the improved construction has rendered successful a type of apparatus which as previously constructed was, in the case of the heaviest airplanes, so short lived as to be impractical.

As has been noted, in Fig. 5 the friction discs 46, 46 are similar to the friction linings 25 of the drum lining shown in Fig. 4 in that reliance is placed upon the layer 46a in Fig. 5 and upon the layer 26 in Fig. 4 for structural strength as well as high thermal conductivity. Where considerable structural strength is demanded this is likely to result in a metallic layer of greater thickness than the demands for thermal conductivity might require; and it is to be observed that this type of construction may be used with special advantage where the apparatus is called upon to dissipate a large amount of heat in a very brief period of time, as is true in the case of the brakes of a heavy transport or bomber plane. The reason for this is that the relatively large mass of the solid metal layer of high thermal conductivity possesses both high thermal conductive capacity and a relatively large sensible heat capacity, and can thus quickly absorb and temporarily store, without suffering deformation, a large amount of heat which, after the release of the brake, may gradually be delivered to the supporting structure, such as the halves of the wheel 42 in Fig. 5. Mention was made of the fact that the solid metal layers 46a may, in some cases, advantageously be formed of aluminum, and that is because of the high specific heat of that metal. The thermal conductivity of aluminum, while relatively high in comparison with ferrous metals and with sintered friction facing materials of the character herein referred to, is of course lower than that of solid copper; but where the conductivity of the aluminum is sufficient for a particular application and a very rapid absorption of heat energy is required, the aluminum may, because of its high specific heat, be preferable to copper for the use in question.

A landing wheel such as shown in Fig. 5 of a size required by large heavy planes may be about six feet in diameter, including the tire, and it will be appreciated that the friction discs 46 of corresponding size are relatively large and heavy and are subject to relatively large diametral expansion and contraction in the operation of the brakes. Accordingly the provision of fastening means for the friction discs which will give the latter freedom for such expansion and contraction is vitally important as is also the yielding character of the yieldable layer 46c of the discs which insures the maintainance of good heat conducting union between the disc and the supporting wheel members 42a, 42b.

The molded asbestos facings 57 and 58 have been used because the relatively low thermal conductivity of this material protects the expansible rubber expander tube 53 from the heat generated during the application of the brakes. However, as was noted in connection with Fig. 3, the molded fibrous friction materials do not stand up as well as might be desired under very severe operating conditions and it may be desirable, under such conditions, to employ an alternative construction such as shown in Fig. 6. Here the movable brake disc 63 (corresponding to disc 49 in Fig. 5) has riveted to it an integral, two-layer friction member 64 comprising a layer 65 of solid copper and a facing layer 66 of sintered friction material composed predominantly of high-melting-point metal; and between the two-layer part 64 and the disc 63 is secured a heat-insulating layer 67 of asbestos or the like.

Whether the construction of Fig. 5 or that of Fig. 6 be employed, the necessity of directing the frictionally generated heat away from the non-rotating friction element and into the movable friction elements carried by the wheel, of course, makes the heat load thrown upon the latter elements all the greater and this renders the problem of providing friction elements capable of withstanding these conditions extremely difficult.

Figure 7:
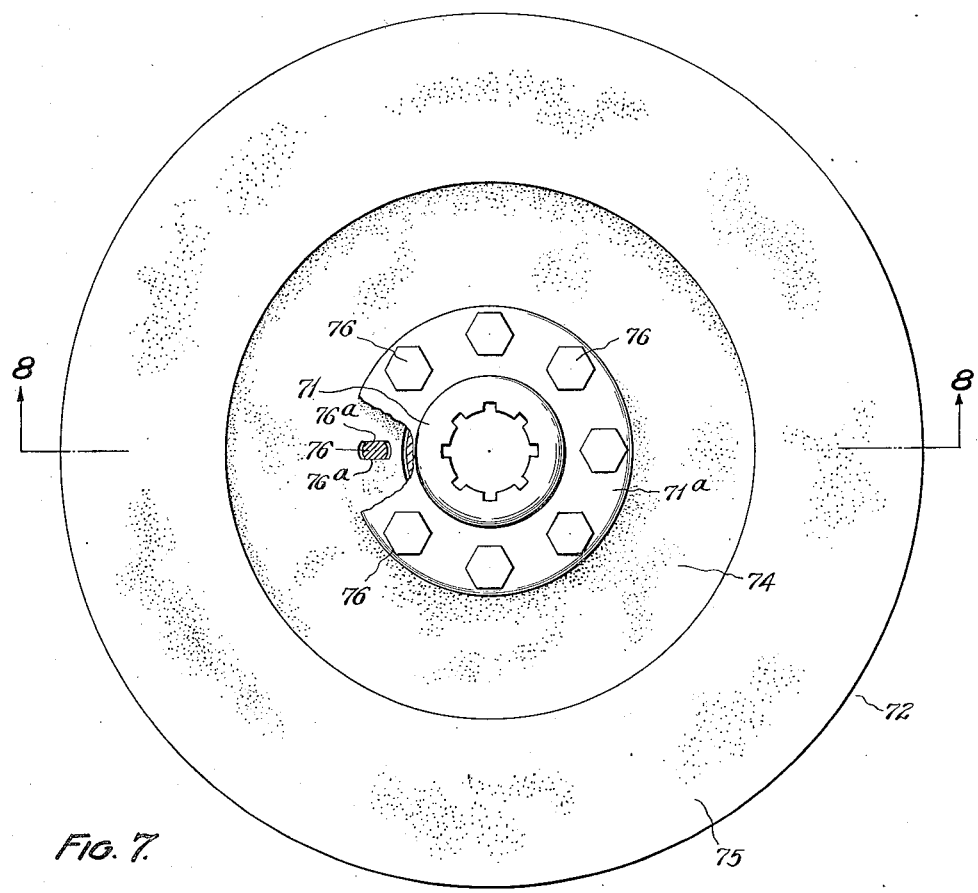
Fig. 7 is a side or face view of a composite clutch disc embodying the invention.
Figure 8:
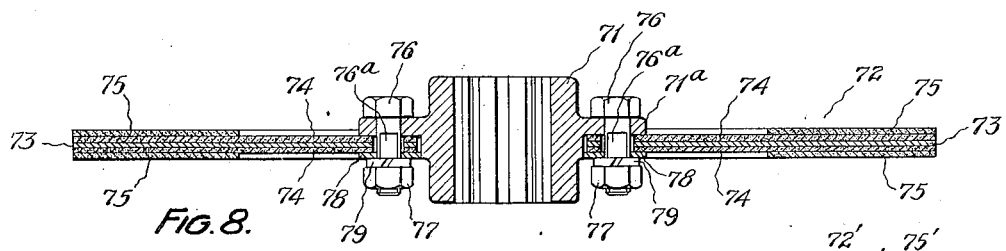
Fig. 8 is a section on the line 8—8 of Fig. 7.

In Figs. 7 and 8 the present invention is shown applied to a clutch disc of the type illustrated in United States Patent No. 2,178,527. Prior to the present invention, the usefulness of clutch discs such as shown in said patent has been limited to relatively low rates of energy absorption because they were not capable of sustaining heavy heat loads without serious distortion that rendered their operation unsatisfactory. These difficulties are overcome in the construction shown in Figs. 7 and 8 in which 71 is the disc hub to which is attached the disc element proper which is indicated as an entirety by the numeral 72. Disc 72 comprises an annular disc 73 of sheet steel which has integrally bonded to each of its sides a layer 74 formed of metal of high thermal conductivity, preferably copper. Such a three-layer structure can be formed by coating the two surfaces of sheet steel with layers of copper by any one of the copper clad steel processes, but we prefer to form the layers 74 of compacted and sintered copper powder in one of the known ways already explained. To the copper layers 74 are integrally bonded friction facing layers 75, 75 of compacted and sintered material composed predominantly of high-melting-point metal such as copper or iron or mixtures thereof. The disc 72 is attached to the flange 71ª of the hub 71 by means of bolts 76 and nuts 77. A washer ring 78 of solid metal, apertured to receive bolts 76, is provided to engage the sintered metal and each nut is provided with a resilient lock washer 79 interposed between the nut and ring 78. Each of the bolts 76 has a tight fit in the circular aperture provided for it in flange 71ª but has opposite flat portions 76ª that slidably engage the straight sides of the elongated aperture provided for it in disc 72. Provision is thus made for thermal expansion and contraction of the disc structure in relation to the hub.

In the operation of the last described clutch disc it will be seen that the structure provides for a very rapid distribution of heat from all parts of the friction layers 75, 75 through the highly conductive layers 74 to all parts of the solid steel layer or core 73. As a result, the improved construction is adapted to handle high rates of energy absorption without any serious localized heating and resultant warping and distortion and highly successful functioning of the disc is attained.

Figure 9:
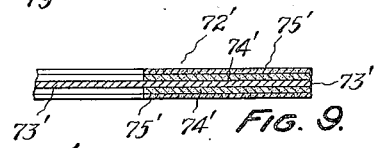
Fig. 9 is a fragmentary sectional view illustrating a modification of the construction shown in Figs. 7 and 8.

In many cases it may be found unnecessary to extend the highly conductive layers 74 fully in to the inner edges of the disc 72. In Fig. 9 is shown a modification in which the disc 72' consists of a solid steel disc 73' and friction facing layers 75', 75' like the layers 75, 75 of Fig. 8 and of intermediate sintered copper layers 74' which are of the same radial width as the facing layers 75' instead of being of the full width of the steel disc 73'.

Figure 10:
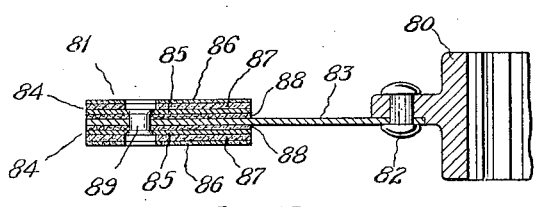
Fig. 10 is a fragmentary sectional view on radial lines of another clutch disc construction embodying the invention.

In Fig. 10 the invention is shown applied to a type of construction in which the disc is fitted with readily replaceable facings. In this construction the hub 80 of the clutch carries a disc, designated as an entirety by 81, which is secured to the hub as by rivets 82. The disc 81 comprises a plain annular disc 83 of sheet steel and two readily replaceable multiple-layer facing members 84, 84. Each of these members is an integral unit consisting of a solid steel ring 85, a facing ring 86 of sintered material composed predominantly of high-melting-point metal, and an intermediate ring 87 of high thermal conductivity, the ring 87 as shown being formed of compacted and sintered powdered metal of high thermal conductivity, such as copper. A layer 88 of material of low thermal conductivity, such as asbestos, is interposed between each of the replaceable members 84 and the disk 83. The disc elements are suitably perforated to receive rivets 89 by means of which the multiple-layer members 84 are secured to the steel disc 83.

The last described type of construction is especially useful from the standpoint of repair or replacement since only the members 84 need be renewed. Because of the multiple-layer construction and for the reasons already explained, a clutch fitted with the replaceable facing rings is capable of operating for long periods of time under severe heat load conditions without warping or distorting.

In Fig. 11 is shown an application of the present invention to a multiple disc type of brake which has found extensive application to the landing wheels of airplanes. In prior airplane brakes of this type the brake discs or rings were formed by applying to plain steel rings friction facings of compacted and sintered powder material composed predominantly of high-melting-point metals, and rings so surfaced were run against plain solid steel rings. Such brakes operated with a considerable degree of satisfaction when applied to airplanes of moderate size and weight but when the attempt is made still further to increase the rate of energy absorption serious difficulties such as have already been described are encountered, the brake discs being warped, contracted or otherwise distorted to an extent to unduly shorten the life of the brake.

These difficulties have been greatly reduced by the application of the principle of the present invention as shown in Fig. 11. Here 91 designates a stub axle upon which the wheel 92 is mounted with interposed antifriction bearings 93 and 94. The axle is provided with a brake flange 91ª on which annular reaction members 95 and 96 are secured by bolts 97 and suitable dowel pins (not shown). Between the reaction members 95 and 96 are disposed brake rings designated as entireties by 98 and cooperating brake rings designated as entireties by 99, there being three of the rings 98 and two of the rings 99. The middle one of the rings 98 comprises a steel ring 98ª which is formed at its inner edge with a circumferential series of teeth 98ᵇ to engage slots 95ª formed in the periphery of member 95. The ring further comprises friction facings 98ᶜ which are preferably formed of compacted and sintered material composed predominantly of high-melting-point metal and interposed metallic layers 98ᵈ, 98ᵈ of high thermal conductivity metal preferably formed by compacting and sintering powdered copper or the like. The two other rings 98 are similarly formed except that the layers 98ᶜ and 98ᵈ are omitted from one side of the steel ring 98ª.

The rings 99 are similar to the intermediate ring 98 except that their peripheral teeth 99ᵇ are formed on their outer edges instead of their inner edges. As shown in Fig. 13, the rings 99 comprise the steel core ring 99ª, the friction facings 99ᶜ and intermediate layers 99ᵈ. The teeth 99ᵇ of the rings 99 operatively engage slots 100ª formed on the inner side of a flange-like brake ring 100 which is secured by bolts 101 to the web of the wheel 92.

For actuation of the brake, the reaction member 95 is formed with an annular chamber 95ᵇ in which is operatively mounted an annular plunger 102 which engages a pressure plate 103 which in turn engages one of the rings 98. Pressure fluid is admitted to the chamber 95ᵇ through a suitable conduit 95ᶜ.

While the friction facings 98ᶜ of the rings 98 and the friction facing layers 99ᶜ of the rings 99 may, if desired, be formed of sintered material of the same composition, I have found it satisfactory to make the material for the facing layers 98ᶜ predominantly of one metal and the material of the facings 99ᶜ of another metal or composition. For example, the composition of the facing layers 98ᶜ may have copper as their predominant constituent and the facing layers 99ᶜ may be formed of sintered iron powder or of a composition having iron as its predominant constituent.

In the operation of the brake shown in Fig. 11, the admission of pressure fluid into the chamber 95ᵇ effects the setting of the brake in a well known manner and, as will be apparent, the multiple-layer friction rings function in the manner and with the advantageous results already described in connection with other forms of construction. With the improved construction described the warping and distortion of the friction rings and the accompanying contraction of the rings, especially of the rings anchored at their inner edges, so that they are prevented from the proper movement axially, are greatly reduced and effective operation over long periods of time is secured even under the most severe operating conditions.

Figure 15:
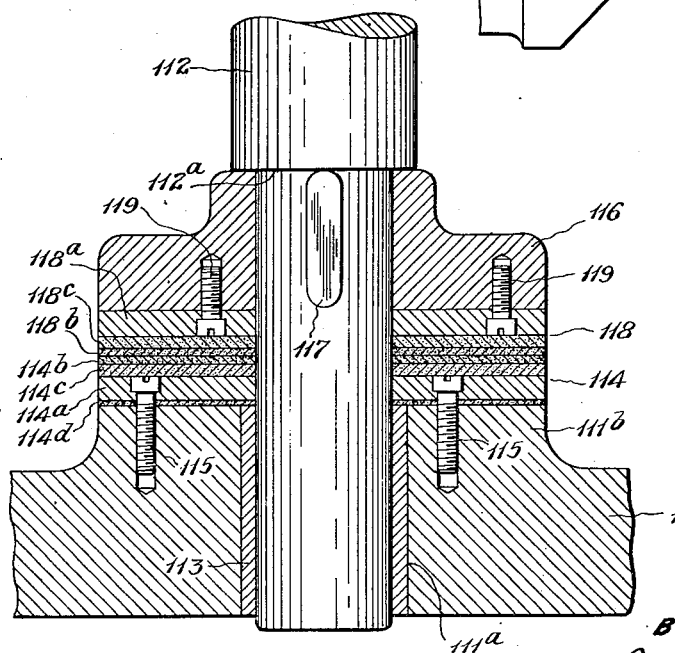
Fig. 15 is an axial sectional view of a step bearing embodying the invention.

Fig. 15 shows another type of frictional apparatus. In this figure is shown a step or thrust bearing in which 111 designates a portion of a machine frame or casing upon which shaft 112 is rotatably supported. The wall section 111 is provided with an upright bearing aperture 111ª in which is mounted a bearing bushing 113 which may be of any well known or conventional type. Wall 111 is formed on its upper side with a bearing boss 111ᵇ with a plain upper surface to which is secured a bearing ring designated as an entirety by 114 and comprising a steel ring or disc 114ª, a friction facing 114ᵇ preferably of condensed and sintered friction material composed predominantly of high-melting-point metal, an intermediate layer 114ᶜ formed of metal of high thermal conductivity and preferably made by compacting and sintering copper powder or the like, and a layer 114ᵈ preferably of sintered copper. The bearing ring 114 may advantageously constitute an integral unit, all of the four layers being bonded together by sintering in accordance with practice hereinbefore referred to and more fully described in United States Patent No. 2,178,527. The ring 114 is suitably apertured to receive screws 115 which secure it rigidly to the structure 111.

The shaft 112 is formed with a shoulder at 112ª to form an abutment for a heavy thrust ring 116 which is nonrotatably secured to the shaft 112 by a key or spline 117. A bearing ring, designated as an entirety by 118 is secured to ring 116 by screws 119. The ring 118 is an integral unit and comprises an iron or steel ring 118ª, a friction facing layer 118ᵇ and an intermediate layer 118ᶜ, the said layers being of the same character, respectively, as the layers 114ᵇ and 114ᶜ, although if desired one of the facing layers 114ᵇ, 118ᵇ may be made predominantly of copper and the other predominantly of iron or the two facing layers may be made predominantly of different mixtures of copper and iron or of other high-melting-point metal. Conventional means may be provided to supply lubricant to the mutually engaging surfaces of the facing layers 114ᵇ and 118ᵇ or the compositions of these layers may be made such as to supply the requisite lubrication, bearing mixtures of this character being well known.

In the operation of a bearing such as shown in Fig. 15, it will be apparent that the advantages incident to the more uniform distribution of the heat generated reduce distortion of the parts and correspondingly favor a trouble-free operation of the bearings; and even where friction facing layers are employed of a character requiring a supply of lubricant to the bearing, in the event of failure of such lubrication the increase in running temperature which ensues does not result in unequal heating with resultant liability of distortion of the parts and serious injury of the bearing which might otherwise result. Furthermore, if under such abnormal conditions some scuffing of the mutually engaging friction surfaces occurs, loosened particles of the friction material do not cause serious trouble because of the capacity of both of the mutually engaging friction layers for embedment of such particles.

In the construction shown in Fig. 15 the lower bearing ring 114 is provided with the layer 114ᵈ of deformable metal to insure good thermal conductivity between the ring 114 and the structure 111 and thus secure the conduction to the structure 111 of the major part of the heat generated between the friction surfaces of the bearing, the larger and more massive member 111 of the bearing structure being better adapted to absorb and dissipate heat than would the upper thrust ring 116.

Figure 17:
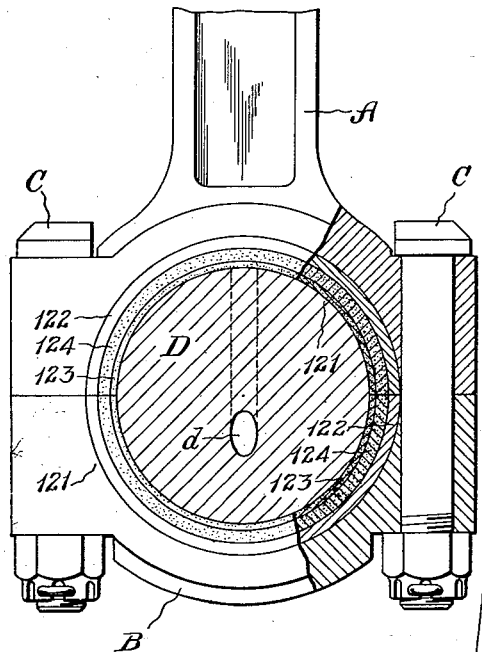
Fig. 17 is a side elevation of the bearing shown in Fig. 16 with a portion broken away to show a part of the structure in section.
Figure 16:
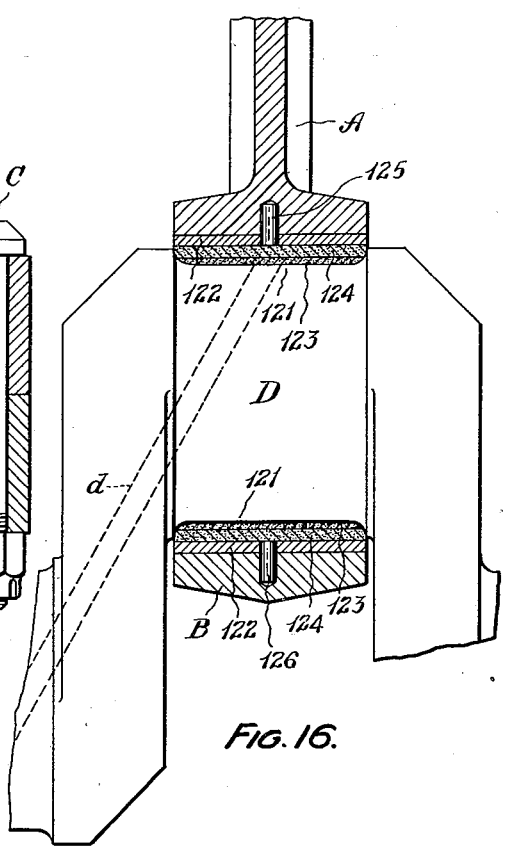
Fig. 16 is an axial sectional view of a connecting rod bearing embodying the invention.

Figs. 16 and 17 show a large end connecting rod bearing embodying the basic principle of the invention. In these figures A designates the body of the connecting rod, B the connecting rod bearing cap and C the securing bolts therefor. D indicates the crank pin of a crank shaft. The bearing proper of the connecting rod is formed in two halves 121, 121, each of which comprises a strong metal layer 122 formed of steel, bronze or the like, a facing layer 123 of compacted and sintered material composed predominantly of high-melting-point metal together with other ingredients suitable for bearing uses, and an intermediate layer 124 of metal having high thermal conductivity and formed preferably by compacting and sintering a suitable metal of high melting point such as copper. The bearing halves 121 are anchored in the connecting rod parts by pins 125, 126 as shown in Fig. 16. The crank shaft structure may be drilled as at d to supply lubricant to the bearing surfaces.

In the operation of the connecting rod bearing the intermediate layers 124 thereof function to insure excellent distribution of heat and effectively prevent localized or unequal heating of the bearing structure and the latter is thus better adapted to operate without injury under the most severe loads and under abnormal conditions, such as failure of the lubricant supply.

It will be apparent from the foregoing description that the underlying principles of the invention are applicable in a wide variety of ways to a wide variety of kinds of frictional apparatus, the different specific embodiments which have been shown and described being merely suggestive of different applications and not in any way intended as comprehensive of the scope of the invention.

It will be observed that in all of the various applications which have been shown and described provision is made for the following important features of the multiple-layer construction: First, in each case the frictional facing layer is backed by a layer of metal having a high thermal conductivity and sufficient thickness to afford a high heat-conductive capacity on lines parallel to the layers of the structure, thus securing a rapid heat distribution throughout the multiple-layer structure and the minimizing of temperature inequalities along any one surface or plane of each layer. Second, each of the layers of the multiple-layer structure is composed predominantly of high-melting-point metal and is capable of withstanding high temperatures without disintegration under the stresses of operation. Third, one of the layers of the multiple-layer structure is formed of solid metal of adequate strength to give the structure needed rigidity and strength. Where the layer of high thermal conductivity which backs the facing layer is formed of solid metal it may also function as a strength-affording layer, but ordinarily a separate strong layer of solid metal, preferably ferrous, is supplied. Fourth, the facing layer, the layer of high conductivity and the layer of strength-affording solid metal are intimately joined together by bonds or connections capable of withstanding high temperatures without disintegration under operating stresses. In all cases the connection between the facing layer and the intermediate layer of high conductivity is in the form of a welded or brazed joint formed (as by sintering) directly between high melting point metals. In many cases the connections are similarly formed between the intermediate layer and the strong layer of solid metal, but in some cases, as in Figs. 4 and 5, mechanical connecting means, such as rivets or bolts, are used with the addition in some cases of a layer of deformable high-melting-point metal to facilitate intimate contact. These mechanical connections obviously are adapted to withstand high temperature operating conditions. Fifth, where an integral three-layer structure is secured to a supporting structure mechanically or otherwise the securing means also is such as to withstand high temperatures without disintegration under operating stresses. The expressions "high-melting-point" and "high temperatures," as here used, are to be understood as meaning melting points and temperatures upwards of 900° F., as was explained in the earlier part of the description.

Another feature which may advantageously be combined with the features above listed, although it and they are separately useful, is the combination of mutually-engaging friction facings both formed of compacted and sintered metallic materials of known character suitable for friction devices such as brakes and clutches and anti-friction devices such as bearings. This subject matter, being the sole invention of one of the present applicants, is not claimed herein.

It is to be observed, in connection with all applications or embodiments of the invention, that the outer frictional facing layer should be made as thin as possible and still have requisite strength and wearing life. This is because the outer surface layer will have a thermal conductivity relatively low, so that it is desirable to make the surface layer thin in order to secure as rapid a flow of heat as possible from the friction surface. The thickness of the intermediate layer of high thermal conductivity will, of course, depend upon the specific conductivity of the layer and upon the amount of heat which is generated at the friction surface in the operation of the device and which must be distributed with sufficient rapidity to insure substantially uniform heat distribution on lines parallel to the layers of the structure. For a given metallic material, the heat conductive capacity of the layer on lines parallel thereto will vary approximately as the mass of its metal per unit area of the layer. In case the layer is formed of sintered metallic powder the mass per unit of volume will, of course, depend upon the pressure with which the material is briquetted. Briquetting pressures of 20,000 pounds to 50,000 pounds per square inch have been found satisfactory for powdered copper. Higher pressures may, of course, be used but the increase in density and specific gravity conductivity resulting from increase of the pressure above the range noted is moderate. The amount of heat generated in the operation of any particular brake or clutch application or in the case of bearings that must operate under very severe conditions is difficult to predetermine and accordingly it will in most instances be necessary to determine the minimum adequate thickness of the intermediate high conductive layer of the structure by actual trial.

In speaking herein of the thermal conductivity of the metal composing the layer (which may be either solid or more or less porous) next to the friction facing layer of the multiple-layer structure, reference is had to the conductivity of the metal itself; and the term "high thermal conductivity" as applied herein to the metal of said layer next to the facing layer, is to be understood as any thermal conductivity not substantially less than 0.40 calory per second per centimeter per square centimeter per degree centigrade. With this system of units, it may be noted, the thermal conductivity of aluminum is about 0.50 calory, of copper about 0.90 calory and of silver about 1.00 calory.

From what has already been said it is apparent that the invention is not limited to the specific forms of construction illustrated but may be embodied as well in other equivalent forms of construction within the scope of the appended claims.

What is claimed is:

1. A multiple layer structure for use as one of the mutually engaging parts in frictional apparatus in the operation of which slippage occurs between those parts, the said structure comprising a structural layer of solid metal, a frictional facing layer of sintered powdered material composed at least predominantly of high-melting-point metal, an intermediate layer disposed between the other said layers and formed of metal of high melting point and thermal conductivity not substantially less than .40 cal./sec./cm./sq. cm./deg. C. and having high thermal conductance parallel to the said layers in comparison with the facing layer and the structural layer, the intermediate layer being integrally bonded to the facing layer substantially throughout their adjacent surfaces, and means intimately uniting the intermediate layer and the structural layer substantially throughout their mutually adjacent surfaces, the several layers, the integral bond between the facing layer and the intermediate layer, and the means uniting the intermediate layer and the structural layer all being capable in operation of the apparatus of withstanding high temperatures without disintegration.

2. A multiple-layer structure as claimed in claim 1 in which the intermediate layer is formed of copper.

3. A multiple-layer structure as claimed in claim 1 in which the intermediate layer is formed of compacted copper powder unified and bonded to the facing element by sintering the said powder.

4. A multiple-layer structure as claimed in claim 1 in which the structural layer is formed of ferrous metal.

5. A multiple-layer structure as claimed in claim 1 in which the intermediate layer is formed of compacted copper powder unified and bonded to the facing layer by sintering of the powder and is integrally united to the structural layer so that the three layers constitute an integral unit.

6. In frictional apparatus in the operation of which slippage occurs between the opposing surfaces of mutually engaging parts thereof, the combination of a multiple-layer structure constituting one of such parts and comprising a frictional facing layer of sintered powdered material composed at least predominantly of high-melting-point metal and a solid metal backing layer to which the facing is integrally connected; a metallic supporting structure for the multiple-layer structure; a layer of material more readily deformable than those of the backing layer and the supporting structure and which is at least predominantly metallic interposed between the solid metal backing layer and the supporting structure; and mechanical means for securing the multiple-layer structure to the supporting structure, the layer of deformable material serving by its deformation to insure good contact with the solid metal backing layer and the supporting structure and to provide good thermal conductivity from the former to the latter.

7. Frictional apparatus as claimed in claim 6 in which the layer of deformable material is integrally united to the solid metal backing layer.

8. Frictional apparatus as claimed in claim 6 in which the solid metal backing layer is formed of metal having thermal conductivity not substantially less than .40 cal./sec./cm./sq. cm./deg. C.

9. In frictional apparatus in the operation of which slippage occurs between the opposing surfaces of mutually engaging parts thereof, the combination of a multiple-layer structure constituting one of such parts and comprising a frictional facing layer of sintered powdered material composed at least predominantly of high-melting-point metal, a solid ferrous metal backing layer and an intermediate layer disposed between and integrally united to the two other layers and formed of metal of high melting point and thermal conductivity not substantially less than .40 cal./sec./cm./sq. cm./deg. C. and having high thermal conductance parallel to the layers in comparison with the facing layer and the backing layer; a metallic supporting structure for the multiple-layer part; a layer of material more readily deformable than those of the backing layer and the supporting structure and which is at least predominantly metallic interposed between the backing layer and the supporting structure; and mechanical means securing the multiple-layer part to the supporting structure, the layer of deformable material by its deformation serving to insure good contact with the solid metal backing layer and the supporting structure and to provide good thermal conductivity from the former to the latter.

10. Frictional apparatus as claimed in claim 9 in which the layer of deformable material is integrally united to the solid metal backing layer.

11. Frictional apparatus as claimed in claim 9 in which the layer of deformable material is made of powdered material sintered and integrally united to the solid metal backing layer of the structure.

12. An integral multiple layer structure for use as one of the mutually engaging parts in frictional apparatus in the operation of which slippage occurs between those parts, one layer of the unitary structure constituting a frictional facing of sintered powdered material composed at least predominantly of high-melting-point metal, one layer of the structure serving as a backing for the facing and being formed of metal of thermal conductivity not substantially less than .40 cal./sec./cm./sq. cm./deg. C. and having a capacity for conducting heat parallel to the layers that is large in comparison with the facing layer, and one layer of the structure being formed of solid metal to contribute strength to the structure.

13. A multiple layer structure for use as one of the mutually engaging parts in frictional apparatus in the operation of which slippage occurs between mutually engaging parts comprising a disc of solid metal, two frictional facing layers disposed, respectively, on opposite sides of the disc and composed at least predominantly of high-melting-point metal, intermediate layers disposed, respectively, between the disc and the two facing layers and formed of metal of high melting point and thermal conductivity not substantially less than .40 cal./sec./cm./sq. cm./deg. C., said intermediate layers having high thermal conductance parallel to the said disc and layers in comparison with the disc and facing layers, and said intermediate layers being integrally bonded to the disc and to the facing layers substantially throughout their adjacent surfaces and the disk and the several layers and the bonds between them all being capable in operation of withstanding high temperatures without disintegration.

14. A multiple-layer structure as claimed in claim 13 in which the disc is formed of ferrous metal.

15. A multiple-layer structure as claimed in claim 13 in which the intermediate layers are formed of compacted metal powder unified and bonded to the facing elements by sintering the said powder.

16. A multiple-layer structure as claimed in claim 13 in which the intermediate layers are formed of compacted copper powder unified and bonded to the facing elements by sintering the said powder.

SAMUEL K. WELLMAN.
CHARLES B. SAWYER.

CERTIFICATE OF CORRECTION.

Patent No. 2,381,941. August 14, 1945.

SAMUEL K. WELLMAN, ET AL.

It is hereby certified that error appears in the printed specification of the above numbered patent requiring correction as follows: Page 8, first column, line 73, after the word "specific" strike out --gravity--; and that the said Letters Patent should be read with this correction therein that the same may conform to the record of the case in the Patent Office.

Signed and sealed this 27th day of November, A. D. 1945.

Leslie Frazer (Seal)

First Assistant Commissioner of Patents.